United States Patent [19]

Daigle et al.

[11] Patent Number: 5,133,523
[45] Date of Patent: Jul. 28, 1992

[54] SUSPENDABLE CONDUIT BRACKET LOCK SYSTEM

[75] Inventors: Robert V. Daigle, Pompano Beach, Fla.; Gordon J. Grice, Janesville, Wis.

[73] Assignee: Creative Systems Engineering, Inc., Janesville, Wis.

[21] Appl. No.: 665,549

[22] Filed: Mar. 7, 1991

Related U.S. Application Data

[63] Continuation-in-part of Ser. No. 480,912, Feb. 16, 1990, Pat. No. 5,044,583, which is a continuation-in-part of Ser. No. 354,860, May 22, 1989, Pat. No. 4,911,387, which is a continuation-in-part of Ser. No. 211,967, Jun. 27, 1988, Pat. No. 4,901,957.

[51] Int. Cl.$^5$ ............................................. F16L 3/00
[52] U.S. Cl. ...................................... 248/62; 248/71; 248/74.1; 248/74.2
[58] Field of Search .................. 248/62, 74.1, 74.2, 248/74.3, 74.4, 74.5, 65, 73, 49, 58, 71, 63, 343, 222.3; 239/201; 138/107

[56] References Cited

U.S. PATENT DOCUMENTS

| | | | |
|---|---|---|---|
| 3,464,172 | 9/1969 | McGee, Jr. | 239/209 X |
| 3,539,137 | 11/1970 | March | 248/62 |
| 4,058,167 | 11/1977 | Granek et al. | 169/61 |
| 4,079,786 | 3/1978 | Moling | 239/209 X |
| 4,252,289 | 2/1981 | Herb | 248/74.1 X |
| 4,330,040 | 5/1982 | Ence et al. | 239/209 X |
| 4,446,818 | 5/1984 | Rigterink | 248/343 X |
| 4,564,163 | 1/1986 | Barnett | 248/71 |
| 4,653,716 | 3/1987 | Sakaguchi | 248/74.5 X |
| 4,669,156 | 6/1987 | Guido et al. | 248/74.3 X |
| 4,728,071 | 3/1988 | Salacuse | 248/74.5 X |
| 4,795,114 | 1/1989 | Usui et al. | 248/74.1 X |
| 4,901,957 | 2/1990 | Daigle et al. | 248/65 |
| 4,911,387 | 3/1990 | Daigle et al. | 248/74.4 X |
| 4,973,014 | 11/1990 | Daigle et al. | 248/74.4 X |

FOREIGN PATENT DOCUMENTS 1272412 7/1968 Fed. Rep. of Germany ..... 248/74.2

Primary Examiner—Ramon O. Ramirez
Attorney, Agent, or Firm—Melvin K. Silverman

[57] ABSTRACT

A modular system for the securement of a conduit to longitudinal constructional member defining in transverse cross-section continuous integral upper and side surfaces in which the side surfaces, at their lower ends, turn inwardly and upwardly to form respective internal longitudinal tracks within the member that are co-directional with a longitudinal axis of the member, which includes elements for horizontal suspension to the interior of the structural building. The system includes a back bracket having, in transverse cross-section, a partial polygonal back surface having several faces, at least one face comprising an externally protruding radial portion including elements for selectable lockable engagement between the radial portion and a longitudinal segment of the constructional member, the bracket having front surfaces defining resilient nesting elements having a partially opened-faced geometry, the nesting elements proportioned to the exterior geometry of the conduit to be secured.

17 Claims, 2 Drawing Sheets

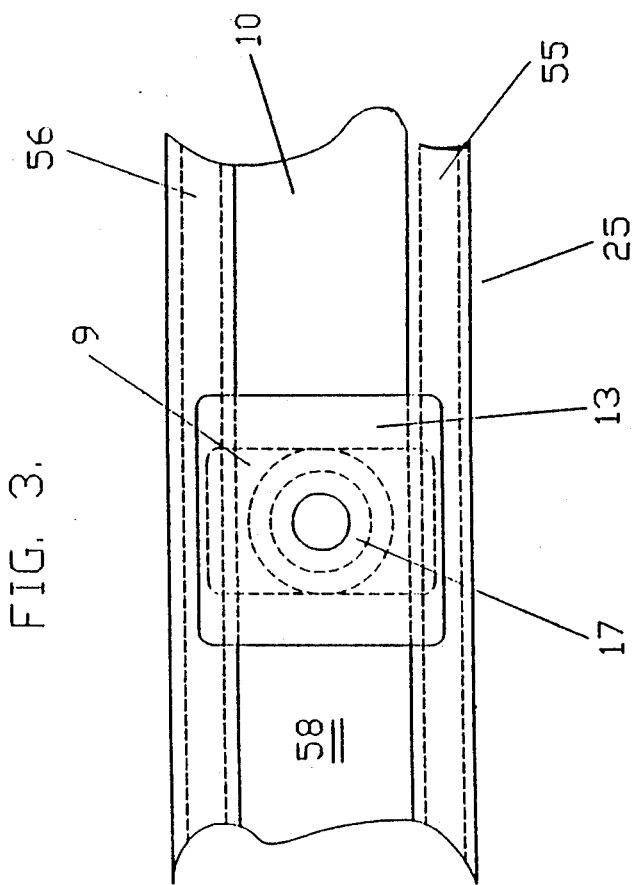
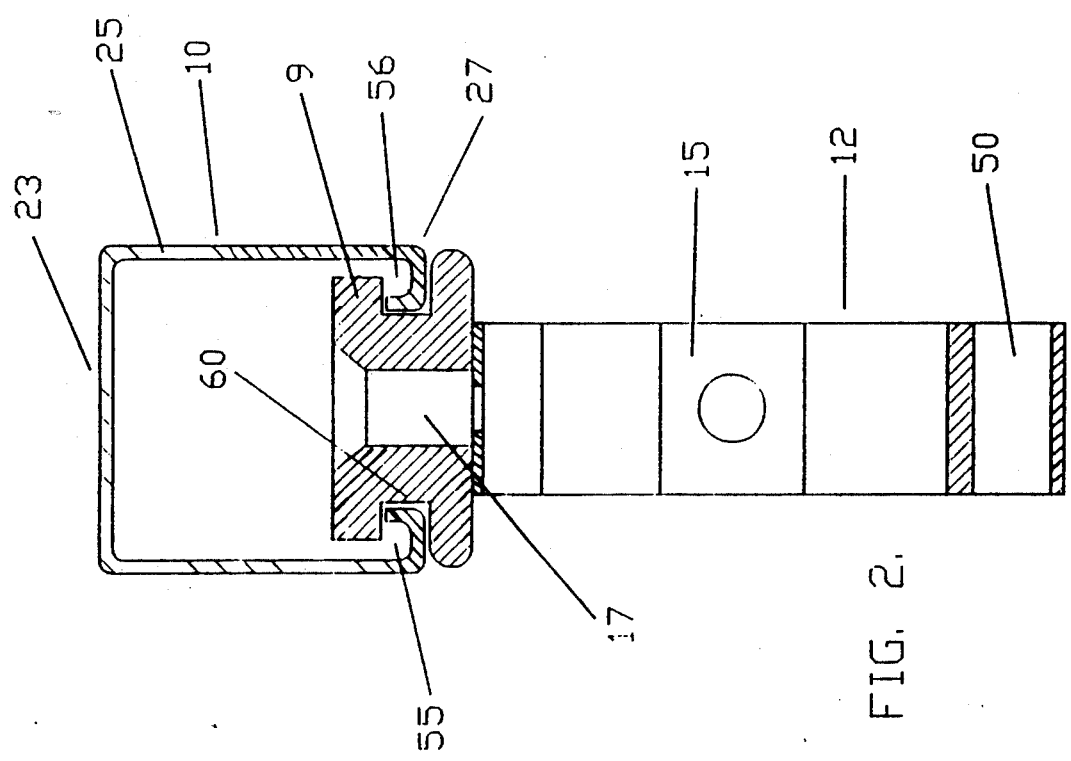

SUSPENDABLE CONDUIT BRACKET LOCK SYSTEM

REFERENCE TO RELATED APPLICATION

This case is a continuation in part of application Ser. No. 07/480,912, filed Feb. 16, 1990, entitled Conduit Bracket Lock System with Flexible Conduit now U.S. Pat. No. 5,044,583. That application is a continuation-in-part of application Ser. No. 07/354,860, filed May 22, 1989—now U.S. Pat. No. 4,911,387 which is itself a continuation-in-part of application Ser. No. 07/211,967, filed Jun. 27, 1988, entitled Modular Conduit System, which in now U.S. Pat. No. 4,901,957.

BACKGROUND OF THE INVENTION

The present invention relates to a bracket and lock system for the suspended securement, typically at or near ceiling level, of selected conduits including, without limitation, electrical and fluid conduits.

In the prior art, the securement of pipes in residential, commercial and industrial enviroments has been a time consuming, tedious and expensive undertaking. Further, the process of servicing such conduits, once installed, has proven to be difficult, expensive and time-consuming.

The present invention is particularly concerned with the adaptation of our invention, entitled Conduit Bracket Lock System with Flexible Hinge, to use with what is termed a UNI-STRUT hanger. The UNI-STRUT, which is more fully described in the Detailed Description of the Invention which follows, typically takes the form of a suspended hollow rod having a rectangular cross section having top, left and right sides thereof and having, as the bottom surface thereof, a resilient element secured within edges of such left and right sides. The concept of the UNI-STRUT hanger is that brackets, of varying types, can be secured, at desired elevations and angulations, thereto, after the hanger itself has been suspended at a desired height and axis within a particular structure. Also, the resilient element may be slidable relative to its edges.

There exists, in the prior art, various types of brackets having utility in the securement of one or another type of conduit. Such systems are represented by our own U.S. Pat. No. 4,911,387 and, somewhat farther field, by U.S. Pat. No. 4,564,163 (1986) to Barnett, entitled Retaining Clip; U.S. Pat. No. 4,252,289 (1980) to Herb, entitled Two Part Type Clip; U.S. Pat. No. 4,079,786 (1978) to Moling, entitled Fire Extinguishing System, and United Kingdom Pat. No. 2,183,287 (1987) to Klein.

None of the above, nor other prior art known to us, discloses a modular conduit system in which the bracket structure may be selectably secured and positioned upon the UNI-STRUT structure and which, in turn, a conduit may be nested within such bracket structure for selective coupling and decoupling thereto. Further, the present inventive system provides for the selective inclusion of insulation about the conduit filled within a self-contained modular protective heat shield as an exterior plate of the bracket. Prior art modular conduit systems do not enjoy the structural integrity, or the option of employing such insulation, nor ease of installation, as is provided by the structure and system herein. Accordingly, the components and systems that exist in the prior art are not capable of performing the above functions and, as well, are not adapted for efficient cooperation with a UNI-STRUT hanger.

The present system is formed completely of components which may be selectably coupled, as by snap and twist fitting, together to form common connections between all components thereof, thusly eliminating the need for much of the laborious aspects associated with installation of conduit piping as has been known in the prior art.

It is in response to the above described limitations in the art that the present invention is directed.

Further, the instant invention constitutes a direct improvement of our co-pending application and U.S. patents as referenced above.

SUMMARY OF THE INVENTION

The instant invention relates to a modular system for the securement of a conduit to longitudinal constructional member defining in transverse cross-section continuous integral upper and side surfaces in which said side surfaces, at lower ends thereof, turn inwardly and upwardly to form respective internal longitudinal tracks within said member that are co-directional with a longitudinal axis of said member, said member including means for horizontal suspension to said interior of said structural building.

The inventive system includes a back bracket having, in transverse cross-section, a partial polygonal back surface having of plurality of faces, at least one face thereof comprising an externally protruding radial portion including means for selectable lockable engagement between said radial portion and a longitudinal segment of said constructional member, said bracket having front surfaces defining resilient nesting means having a partially opened-faced geometry, said nesting means proportioned to the exterior geometry of said conduit to be secured.

The invention employs a conduit proportioned for complemental coupling to said nesting means of said back plate. A front plate is proportioned, in transverse cross section, for complemental engagement with a first complemental coupling means of said back bracket. There is, preferably, provided a corrugated flexible hinge in integral communication with a radial surface of said front plate opposite a surface of said back bracket proportioned for said complemental engagement with said first complemental coupling means. Said flexible hinge is further integral with a surface of said rear bracket not coupled to said conduit. Said flexible hinge operates to connect an otherwise non-functional surface of said inner front plate to an otherwise non-functional surface of said back bracket to maintain said front plate in a desired spatial relationship to said back bracket, prior to said complemental engagement of said front plate to said first complemental coupling means of said back bracket, without the need for the user of the system to independently hold or secure said front plate prior to its complemental engagement with said back bracket.

It is accordingly an object of the present invention to provide an improved UNI-STRUT and conduit bracket lock system.

It is another object of the invention to provide a conduit bracket lock system compatible for use with an UNI-STRUT suspension system.

It is a further object of the invention to provide an improved conduit bracket and UNI-STRUT suspension system having particular utility and convenience in the suspension of electrical and fluid conduits along axes that may or may not be co-linear or co-parallel with the axis of a suspended UNI-STRUT hanger.

It is a yet further object of the present invention to provide a conduit bracket lock system particularly adapted for ease of installation and servicing of a secured conduit.

The above and yet other objects and advantages of the invention will become apparent from the hereinafter set forth Detailed Description of the Invention, the Drawings, and Claims appended herewith.

BRIEF DESCRIPTION OF THE DRAWINGS

FIG. 2 is a diametric cross-sectional view taken along Line 2—2 of FIG. 1.

FIG. 3 is a sectional view taken along Line 3—3 of FIG. 1.

DETAILED DESCRIPTION OF THE INVENTION

Figure 1:
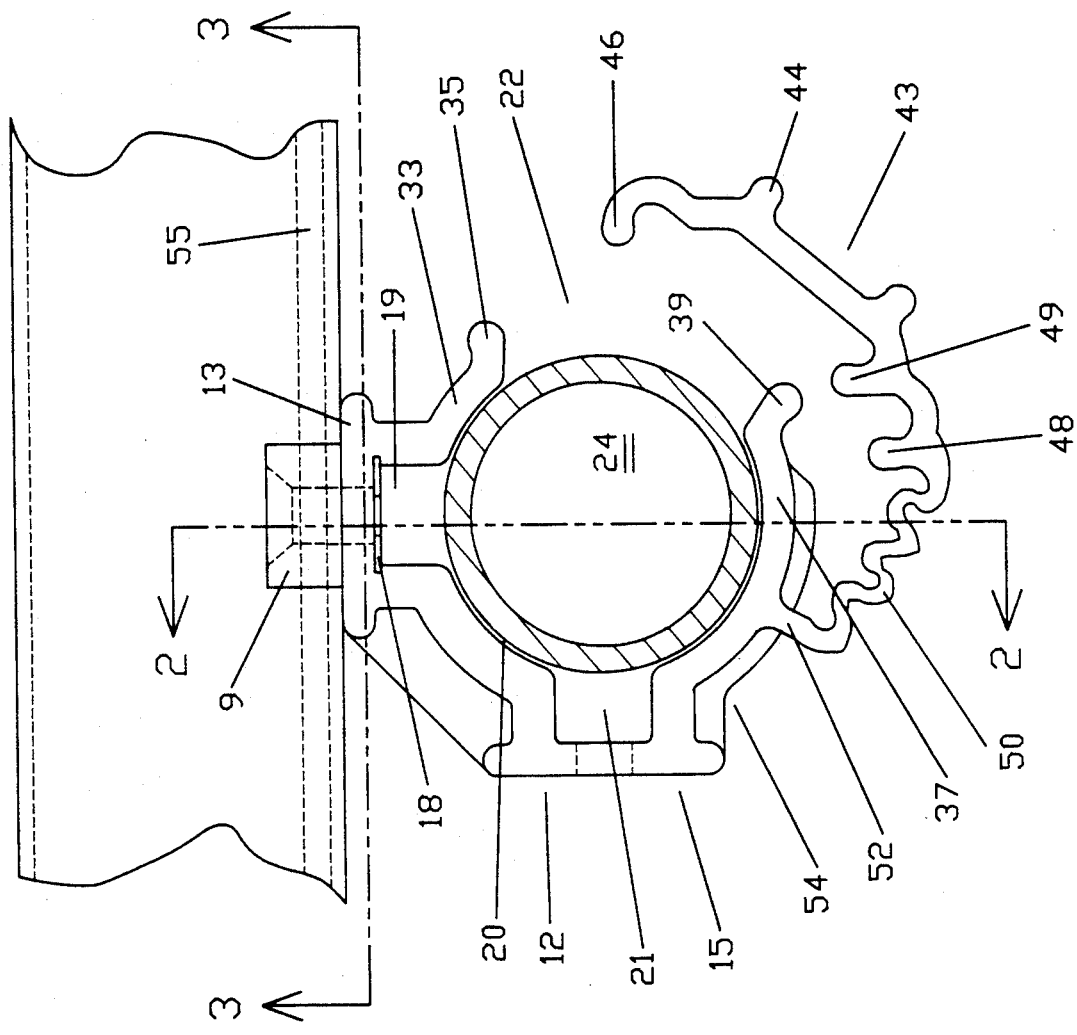
FIG. 1 is a radial, cross-sectional, operational view of the instant invention.

With reference to the views of FIGS. 1 and 2, the modular conduit system is seen to include a back bracket 12 having a plurality of polygonal surfaces 13 and 15. In the view of FIG. 2, said surface 13 is integral with a resilient radial portion 9 of bracket 12. A threaded radial opening 17 is also shown. As may be noted, each of said surfaces 13 and 15 is proportioned for securement to at least one longitudinal constructional member 10 if the surface is provided with radial portion 9.

With reference to the figures it may be seen that longitudinal member 10 defines, in transverse cross-section, continuous upper and side surfaces 23 and 25 respectively. At lower ends 27 thereof the surface of the longitudinal member 10 turn inwardly and upwardly to form longitudinal tracks 55 and 56 that are co-directional with the longitudinal axis of member 10.

It is noted that member 10 includes means for horizontal suspension (not shown) to an interior of a structural building.

Upon a radial inner side 20 of said bracket 12 are provided a plurality of inner radial recesses 19 and 21 which correspond respectively to said polygonal faces 13 and 15. One of the important functions of such recesses is to provide radial flexibility to the back bracket 12 to assist in the below described coupling functions.

With further reference to FIG. 1, it is noted that said back bracket 12 further includes upper and lower first complemental coupling means 35 and 39 respectively which are disposed along opposing sides of open jaw 22 of said back bracket 12. More particularly, the upper first complemental coupling means 35 depends from an arm 33 of the back bracket 12, while the lower first complemental means 39 depends from an arm 37 including surface 20 of back bracket 12.

Also shown in the view of FIG. 1 is a conduit 24 that may be snapped-fittably, i.e., complementally, coupled within back bracket 12 by pressing conduit 24 thru open jaw 22 between said first complemental coupling means 35 and 39 so that the conduit 24 will abut against surface 20 and the entrance to recesses 19 and 21.

The inventive system optionally includes a snap-on inner front plate 43 shown in radial cross-section in FIG. 1. Said front plate 43 is proportioned for complemental engagement with said first complemental coupling means 35 and 39 of back bracket 12. Front plate 43 is provided with nobs 44 which are useful in the gripping of plate 43 to press gripping elements 46, 48 and 49 against said complemental coupling means 35 and 39.

With further reference to FIGS. 1 and 2, there is shown a flexible hinge 50 which is in integral communication with the general region of plate 44 associated with gripping element 48. Further, flexible hinge 50 is in integral communication with bracket 12 in the region of lower area 52 thereof.

It is to be noted that flexible hinge 50 generally defines an axis which is substantially parallel to the lower surface of back bracket 12 in the area of region 37.

It is to be further noted that hinge 50 defines a resilient corrugated surface which is generally according or spring-like in character.

The basic function of flexible hinge 50 is to render more convenient to the installer of the instant system the act of attaching plate 43 to bracket 12. In other words, the presence of flexible hinge 50 renders unnecessary the separate holding or securement of plate 43 relative to back bracket 12. As such, a substantial savings in time and effort as well as enhanced safety to the installer is accomplished.

In accordance with the present invention, radial position 9 of polygonal back surface 13 of said back bracket 12 is inserted into longitudinal opening 58 of member 10 in an orientation rotated 90 degrees relative to the view of FIG. 3. That is, the length of portion 9 is initially aligned with the axis of opening 58. Thereafter bracket 12 and with it, portion 9 is twisted 90 degrees into the locked position of FIGS. 2 and 3. As may be noted, side recesses 60 of portion 9 are locked against tracks 55 and 56 and member 10. As such the axis of conduit 24 will be at a right angle to the axis of member 10.

Also shown in FIG. 1 is a pal nut 18 which receives a threaded member through hole 17.

There is also shown in FIG. 1 a partial circumferential rigid rib 52 which surrounds areas above and below polygonal surface 15. The purpose of rib 52, which is optional in the present inventive structure, is to afford enhanced rigidity to bracket 12. Also, it is useful where surface 15 is secured (additionally to said hanger securement) to a vertical wall (not shown).

It is to be appreciated that the instant inventive structure may be adapted for use with any of a number of so-called UNI-STRUT plumbing hangers and, as such, is not to be limited to the particular hanger shown in the figures.

Accordingly, while there has been shown and described the preferred embodiment of the present invention, it is to be appreciated that the invention may be embodied otherwise than is herein specifically shown and described and that, within said embodiment, certain changes may be made within the detail and construction thereof without departing from the underlying idea or principles of the present invention within the scope of the Claims appended herewith.

Having thus described our invention what we claim as new, useful and non-obvious and, accordingly, secure by Letters Patent of the United States is:

1. A modular suspension system for securing a conduit within the interior of a structural building comprising:

(a) a substantially hollow longitudinal constructional member defining, in transverse cross-section continuous integral upper and side surfaces in which said side surfaces, at lower ends thereof, turn inwardly and upwardly to form respective internal longitudinal tracks within said member that are co-directional with a longitudinal axis of said member, said member including means for horizontal suspension to said interior of said structural building, and (b) a back bracket having, in transverse cross-section, a partial polygonal back surface having a plurality of faces, at least one face thereof comprising an externally protruding radial portion including means for selectable lockable engagement between said radial position and a longitudinal segment of said constructional member which is between transverse cross-sections thereof, said back bracket further comprising front surface defining resilient nesting means having a partially opened-face geometry, said nesting means proportioned to the geometry.

2. The system as recited in claim 1 in which said back bracket further comprises, along opposite transverse edges thereof, complemental coupling means, and in which said system further comprises a front plate proportioned, in transverse cross-section, for complemental engagement with said complemental coupling means.

3. The system as recited in claim 1 in which said lockable engagement means of said radial portion of said one face of said back bracket comprises:
  rotational locking means.

4. The system as recited in claim 2 in which said lockable engagement means of said radial portion of said one face of said back bracket comprises:
  rotational locking means.

5. The system as recited in claim 3 in which said longitudinal constructional member comprises:
  support hanger.

6. The system as recited in claim 5 in which said support hanger comprises:
  a plumbing hanger.

7. The system as recited in claim 2 in which said support hanger comprises:
an electrical hanger.

8. The system as recited in claim 5 in which said lockable engagement means includes a vertical receptable thru which a threaded element may be inserted to effect further securement of said radial portion of said back bracket within said longitudinal segment of said constructional member.

9. The system as recited in claim 5, in which said back bracket further comprising a partial circumferential rigid rib extending about a second of said polygonal back surfaces.

10. The system as recited in claim 5 in which said resilient surface comprises a surface longitudinally slidable relative to said longitudinal constructional surface.

11. The system as recited in claim 4 further comprising:
  flexible hinge means in integral communication with that surface of said front plate positioned opposite to said back bracket, said hinge further integral with the surface of said back bracket not coupled to said conduit.

12. The system as recited in claim 11 in which said flexible hinge means defines a resilient corrugated surface.

13. The system as recited in claim 12 in which said corrugated surface defines a spring-like accordion surface.

14. The system as recited in claim 11 in which said longitudinal constructional surface comprises a support hanger.

15. The system as recited in claim 14 in which said back bracket further comprising a partial circumferential rigid rib extending about a second of said polygonal back surfaces.

16. The system as recited in claim 14 in which said resilient surface comprises a surface longitudinally slidable relative to said longitudinal constructional surface.

17. The system as recited in claim 15 in which said resilient surface comprises a surface longitudinally slidable relative to said longitudinal constructional surface.

* * * * *